(12) United States Patent
Nicholson et al.

(10) Patent No.: US 9,998,860 B2
(45) Date of Patent: Jun. 12, 2018

(54) MOBILE NETWORK BASED GEOFENCING (71) Applicant: INTERNATIONAL BUSINESS MACHINES CORPORATION, Armonk, NY (US)

(72) Inventors: Robert B. Nicholson, Hampshire (GB); Mudhakar Srivatsa, Yorktown Heights, NY (US); Kiran Raghu Ganti, Yorktown Heights, NY (US); Dinesh Verma, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 36 days.

(21) Appl. No.: 14/901,124

(22) PCT Filed: May 13, 2014

(86) PCT No.: PCT/EP2014/059700
§ 371 (c)(1),
(2) Date: Dec. 28, 2015

(87) PCT Pub. No.: WO2014/206627
PCT Pub. Date: Dec. 31, 2014

(65) Prior Publication Data
US 2016/0142872 A1 May 19, 2016

(30) Foreign Application Priority Data
Jun. 26, 2013 (GB) .................................. 1311342.8

(51) Int. Cl.
*H04W 12/00* (2009.01)
*H04L 29/08* (2006.01)
(Continued)

(52) U.S. Cl.
CPC ............. *H04W 4/021* (2013.01); *H04L 67/26* (2013.01); *H04W 76/046* (2013.01)

(58) Field of Classification Search
CPC ...... H04W 4/021; H04W 76/046; H04L 67/26
See application file for complete search history.

(56) References Cited

U.S. PATENT DOCUMENTS 9,060,248 B1 * 6/2015 Coulombe ............ H04W 4/021
2008/0186165 A1 8/2008 Bertagna et al.
(Continued)

OTHER PUBLICATIONS

International Search Report for PCT/EP2014/059700 dated Jul. 10, 2014.

*Primary Examiner* — Dinh P Nguyen
(74) *Attorney, Agent, or Firm* — David Zwick, Esq.; Kevin P. Radigan, Esq.; Heslin, Rothenberg, Farley & Mesiti, P.C.

(57) ABSTRACT

Managing a geofence of a mobile device in a network is provided, which includes: identifying, by a first application operable with the mobile device, the geofence associated with the mobile device or a user of the mobile device; based on identifying the geofence, registering the identified geofence with a network component; identifying, to a first granularity, a first location for the identified geofence; monitoring, to a second granularity, a location of the mobile device, where the first granularity is more coarse-grained than the second granularity; and based on the mobile device triggering the geofence, pushing a notification to the application; and based on receiving the notification, performing an operation associated with the geofence.

16 Claims, 8 Drawing Sheets

(51) Int. Cl.
*H04W 76/04* (2009.01)
*H04W 4/02* (2018.01)

(56) References Cited

U.S. PATENT DOCUMENTS

| | | | | |
|---|---|---|---|---|
| 2009/0029673 A1* | 1/2009 | Hamadi | ................ | H04M 15/80 |
| | | | | 455/405 |
| 2009/0061856 A1* | 3/2009 | Kazmi | ................. | H04M 15/00 |
| | | | | 455/433 |
| 2010/0322128 A1* | 12/2010 | Becker | ................... | H04W 4/08 |
| | | | | 370/312 |
| 2011/0250875 A1* | 10/2011 | Huang | ................... | H04W 4/02 |
| | | | | 455/418 |
| 2011/0250901 A1* | 10/2011 | Grainger | .............. | H04W 4/021 |
| | | | | 455/456.1 |
| 2011/0312363 A1* | 12/2011 | Kolding | ................ | H04B 7/024 |
| | | | | 455/513 |
| 2012/0172027 A1 | 7/2012 | Partheesh et al. | | |
| 2012/0265585 A1* | 10/2012 | Muirbrook | ............ | G06Q 20/20 |
| | | | | 705/13 |
| 2013/0023237 A1* | 1/2013 | Meredith | ............. | H04W 12/06 |
| | | | | 455/411 |
| 2013/0091452 A1* | 4/2013 | Sorden | ................... | G06F 3/048 |
| | | | | 715/771 |

* cited by examiner

MOBILE NETWORK BASED GEOFENCING

BACKGROUND

The present invention is generally directed to geolocation functionality of a mobile device in a network. In particular, it provides a system and a method suitable for managing a geofence associated with the geolocation of the mobile device.

Cellular phones are increasingly becoming used for a variety of rich media purposes, such as taking photographs, playing music and performing more complex computational tasks. As such, companies are now viewing the mobile platform as a medium to provide users will value-added targeted services. Targeting can be based on the context of the user themselves, and also be location dependent. The context of the user could include attributes of the user, their likes, status, habits, what the user is currently doing, a context of the mobile device and network, battery state, radio signal state, location in three dimensions, movement, mode of transport etc.

The continuing growth of mobile data traffic, smart phone penetration and the realization of the "Internet of things" have placed requirements upon mobile network infrastructure that the infrastructure was not originally designed to accommodate. Adding more intelligence at the edge of mobile networks allow operators to optimize their infrastructure to deal with unprecedented amounts of traffic, to rapidly deliver innovative features to accelerate data services and to enable a completely unique mobile broadband experience that can be directly translated into values.

One example of recent edge of network functionality is provided by IBM® WebSphere® Application Service Platform (ASPN). This leverages IBM's ASPN edge of network capability which is described here:
http://www-01.ibm.com/common/ssi/cgi-bin/ssialias?subtype=WH&infotype=SA&appname=SWGE_WS_WS_USEN&htmlfid=WSW14201USEN&attachment=WSW14201USEN PDF
(Retrieved from the Internet on 22 Jun. 2013).

The business owners of mobile device applications (app) would like to provide a service to a user of that app when the user enters a particular small and well defined geographic area. For example, a voucher could be provided to a user when the user enters a shop.

One problem is that users routinely disable location based apps to conserve device battery life. Therefore, existing location based apps are ineffective in relation to geofence functionality.

A geofence is a virtual perimeter for a real-world geographic area. A geofence is active when a specified user or device enters (alternatively leaves) the area.

Geofencing APIs provide means to sense or generate an event for an active geofence. Therefore, contextual applications and use cases can be enabled. Known geofence APIs include those of Google, which operates in the device; and of Sprint, which operates in the network.

A solution which takes an action when a user enters a geographic area is known as a geofence based solution.

A practical geofence solution requires the coupling of two technologies: i) a geolocation (finding where the mobile device is) and ii) geofencing determining whether the mobile device is within a defined area).

Using today's technology there are two ways to do geolocation: mobile device based geolocation; and network based geolocation.

In mobile device based geolocation, the geofencing implementation must constantly monitor the mobile device location via one of the mobile device based location methods which include, for example, Global Positioning System (GPS), Monitoring WiFi MaC addresses, cell identifiers, or cell triangulation. All of these methods require the device to be actively processing information all the time and many require power-hungry hardware to be turned on in the device. These tend to drain the battery very quickly. As these techniques drain the battery very quickly users generally will not leave these types of applications running for long periods. Typically the users will try to remember to turn them on when they might be useful, but typically this means that the applications are not running at the point in time where a useful solution could be provided.

Recently technology has been implemented to try to reduce the battery usage by implementing a two tier system which uses course-scale location to fix an approximate location and then enables the GPS only when fine-scale location is necessary. This technology however still uses battery on the mobile device and as a result consumers are reluctant to enable it. Other mobile device application technologies use one processor on the mobile device to fix a coarse granularity of location, and another processor to fix a fine granularity of location.

U.S. Pat. No. 8,396,485 B2 (Grainger, M. et al. "Beacon-based Geofencing", Mar. 12, 2013) discloses a baseband subsystem that monitors a coarse location of a mobile device. The application subsystem then carries a fine grained geolocation.

Alternatively, network based geolocation can be used. Traditional network based geolocation uses information extracted from the network control plane to determine the location of the device. Such information includes call data records (CDRs) indicating cell handover or routing area handover. However, such techniques are typically capable of locating a user to a granularity of at best one cell in a cellular telecommunications system. Since cells can be several kilometers in diameter this is quite a low granularity system.

Recently new techniques have emerged for calculating location in a cellular network. One such technique, sometimes termed "radio frequency pattern matching" (RFPM) involves intercepting the regular Network Management Reports (NMRs) which are sent from the mobile device to the network. These NMRs contain detailed information about the signal strength from multiple transmitters as seen by the mobile device. The RFPM technique creates a database of many such observations correlated with the known true position of the mobile device that created the NMR. The true position in this case is generated from GPS or some other highly accurate technique. Once this database of observations has been built up, it is possible to determine the location of a mobile device in two or three dimensions by comparing the NMRs it produces to the database of previously collected NMRs. Such correlations lead to highly accurate position fixes, particularly indoors or in dense urban environments which exhibit characteristic reflections and attenuation produced by walls and buildings. The technique is made even more accurate by tracking the movement of the user over time and by building up a large database showing NMRs from many different types of device in many weather and radio conditions.

There are drawbacks with existing geofencing solutions. Existing device based solutions tend to drain the device battery and typically cannot use high precision GPS when operating inside buildings. Existing network based geofencing implementations use low granularity (that is course-scale) location. Cell-id based geofencing will locate a user to the area of a cell which may have a radius of 1 to 5 km. There is no solution today which combines fine scale network based geolocation with geofencing to create a geofence with a diameter of a few tens of meters.

Moreover, the most obvious architecture to create such a system would be to connect fine scale geolocation (Radio Frequency Pattern Matching) with geolocation on a large computer server or cluster at the core of the network. The problem with this obvious solution is that tracking the real time location, second by second of upwards of a million users in a network of up to 50,000 cell towers and determining whether each user has triggered one of the geofences that are active for that user is a huge compute task.

Therefore, there is a need in the art to address the aforementioned problem.

SUMMARY

In one or more aspects, a system for managing a geofence of a mobile device in a network is provided. The system includes a memory, and a processor communicatively coupled to the memory. The system performs a method comprising: based on identifying a geofence associated with a mobile device or a user of the mobile device, registering the identified geofence with a network component; identifying, to a first granularity, a first location of the identified geofence; monitoring, to a second granularity, a location of the mobile device, wherein the first granularity is more course-grained than the second granularity; and based on the mobile device triggering the geofence, pushing a notification to a first application operable with the mobile device to facilitate performing an operation associated with the geofence.

In one or more further aspects, a method of managing a geofence of a mobile device in a network is provided. The method includes: based on identifying a geofence associated with a mobile device or a user of the mobile device, registering the identified geofence with a network component; identifying to a first granularity, a first location for the identified geofence; monitoring to a second granularity a location of the mobile device, wherein the first granularity is more course-grained than the second granularity; and based on the mobile device triggering the geofence, pushing a notification to a first application operable with the mobile device to facilitate performing an operation associated with the geofence.

In one or more further aspects, a computer program product is provided for managing a geofence of a mobile device in a network. The computer program product includes a computer-readable storage medium having program instructions embodied therewith, the program instructions being executable by a processor to cause the processor to perform a method comprising: based on identifying a geofence associated with a mobile device or a user of the mobile device, registering the identified geofence with a network component; identifying to a first granularity, a first location for the identified geofence; monitoring to a second granularity, a location of the mobile device, wherein the first granularity is more course-grained than the second granularity; and based on the mobile device triggering the geofence, pushing a notification to a first application operable with the mobile device to facilitate performing an operation associated with the geofence.

BRIEF DESCRIPTION OF THE DRAWINGS

The present invention will now be described, by way of example only, with reference to certain embodiments depicted in the figures, in which.

DETAILED DESCRIPTION

Figure 1:
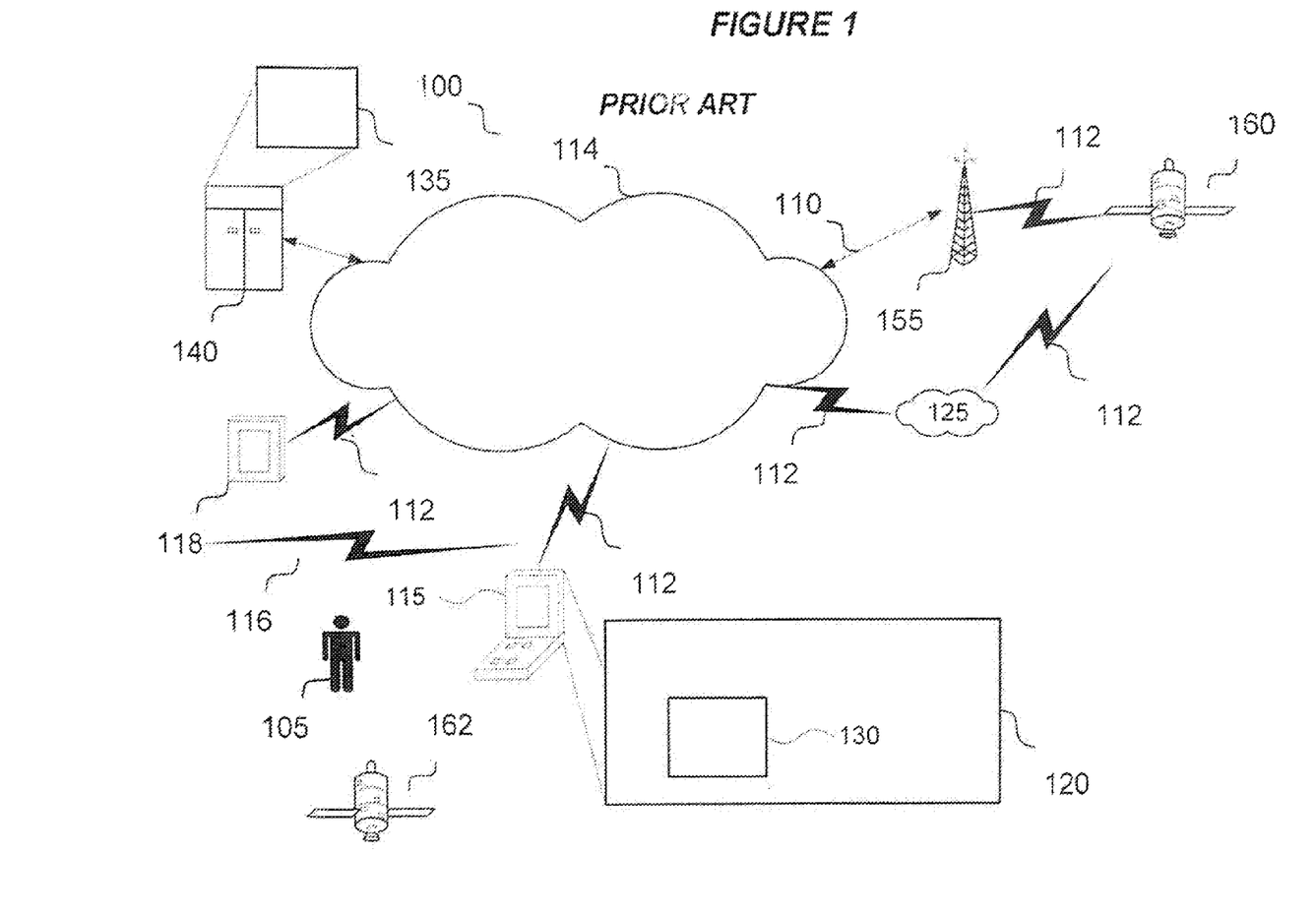
FIG. 1 is a block diagram depicting a telephony system, in accordance with the prior art, and in which an embodiment of the present invention may be implemented.

FIG. 1 is a block diagram depicting a telephony system 100, in accordance with the prior art, and in which one or more embodiments of the present invention may be implemented. Throughout the figures, the same feature numbers relate to the same features of the present invention. The telephony system 100 comprises mobile devices, such as phones 115 and personal digital assistants (PDAs) 118 connectable through a network 114, which may comprise a wired network 110, or wireless networks 112. Another example of a mobile device is an integrated mobile system in a car, operable to interact with devices outside of the car (e.g. satnav, GPS devices). Other examples include a computer tablet device, a laptop, an Internet of Things (IoT) device, a smart phone etc. The telephony system 100 also comprises a telephony cell 125. The personal electronic devices 115, 118 may be connectable through the network 114 through a radio mast 155 or a satellite 160. The personal electronic devices 115, 118 may also be connectable through a peer-to-peer (P2P) connection 116, which may be wired or wireless. The phones 115 may be mobile phones, or wired phones. Personal electronic devices 115 may also be connectable to each other through alternative communication means, for example through a wireless (Wi-Fi), Bluetooth® or other wireless short distance connection protocols. The phone(s) 115 may also be operable with a Global Positioning System (GPS) system 162 for geolocation services. Alternatively, geolocation services can be provided with nearby Wi-Fi systems (not shown) or network transmitters/receivers at the radio mast 155. It will be evident to the skilled person that other methods to identify other local electronic devices, and for locational coverage information gathering, are possible. For example, the use of a GPS network (not shown) can also identify the location of local electronic devices 118 if GPS-enabled, as well as the location of the mobile phones 115. This can be achieved through recording GPS co-ordinates for enabled mobile phones 115.

Bluetooth is a wireless technology standard for exchanging data over short distances between electronic devices. Many electronic devices have Bluetooth technologies incorporated, for example, mobile phones, watches, modems, headsets, memory devices, and in-car electronic systems.

Typically, an operating system (OS) 120 and a client-side application (app) 130 are operable on the personal electronic device (e.g., phones 115). Typically mobile phone apps have both a client-side and server-side aspects, with the client-side app 130 interoperating with a server-side application 132, which is operable on a server 140 available to the network.

For the avoidance of doubt, the term "application" 130, 530, 135, 535 as used herein throughout the description and claims is to be construed as an application 130, 135 that could solely be a client-side application 130, solely a server-side application 135, or a combination of both client-side 130 and server-side 135 applications.

Figure 2:
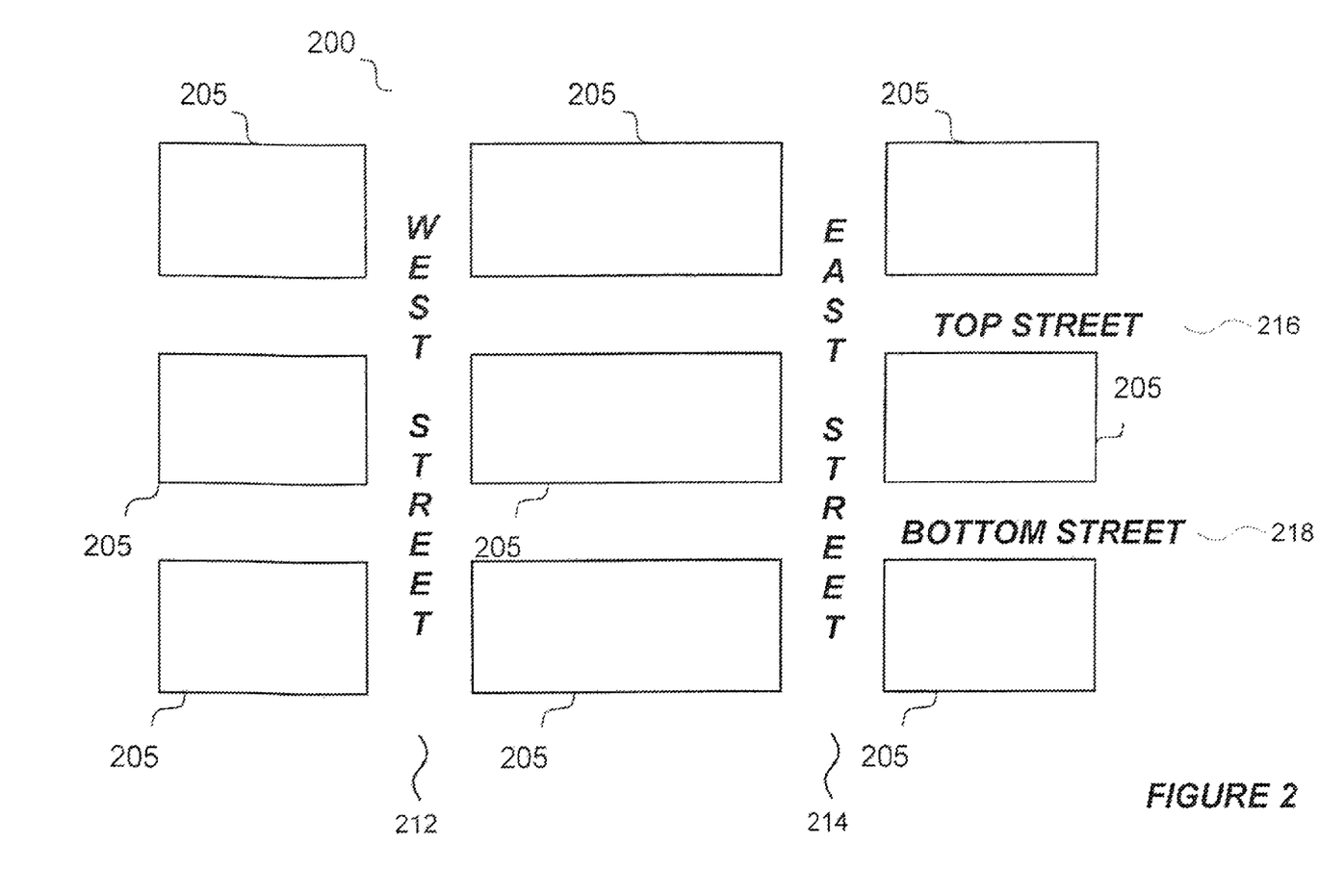
FIG. 2 is a block diagram depicting a map of a town in which an embodiment of the present invention may be implemented.
Figure 3:
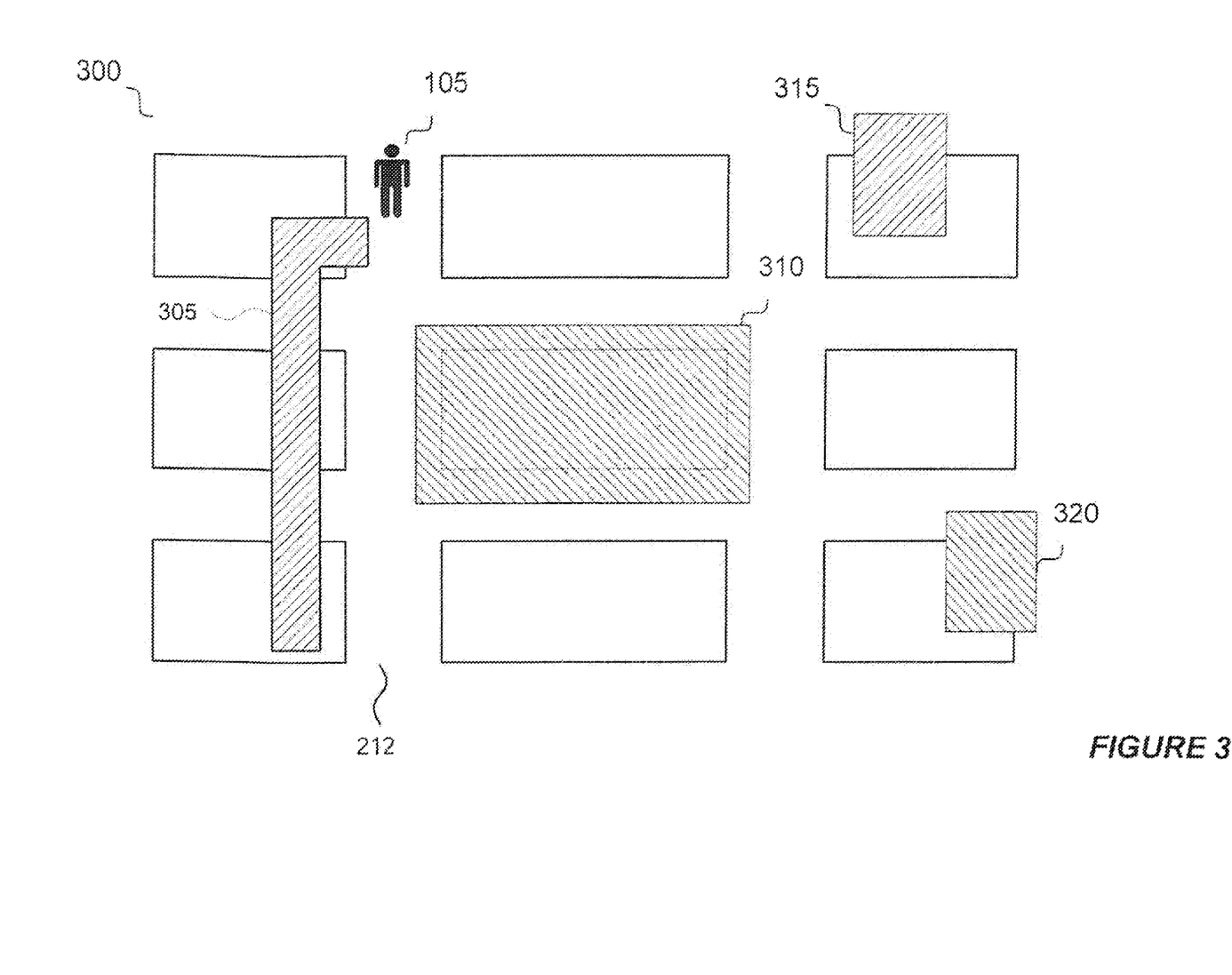
FIG. 3 is also is a block diagram depicting a user map of the town in which an embodiment of the present invention may be implemented.

FIG. 2, which should be read in conjunction with FIG. 3, is a block diagram depicting a map 200 of a town in which one or more embodiments of the present invention may be implemented. The map 200 comprises images of blocks of buildings 205, and four intersecting roads 212, 214, 216, 218.

FIG. 3 is also is a block diagram depicting a user map 300 of the town in which one or more embodiments of the present invention may be implemented. The user map 300 depicts the buildings and roads of the town. A user 105 is depicted at being located in one road 212. Also depicted are four defined geofences 305, 310, 315, 320. Although depicted as having straight edges, the skilled person will appreciate that a geofence can be defined as having any shape or size.

Figure 4:
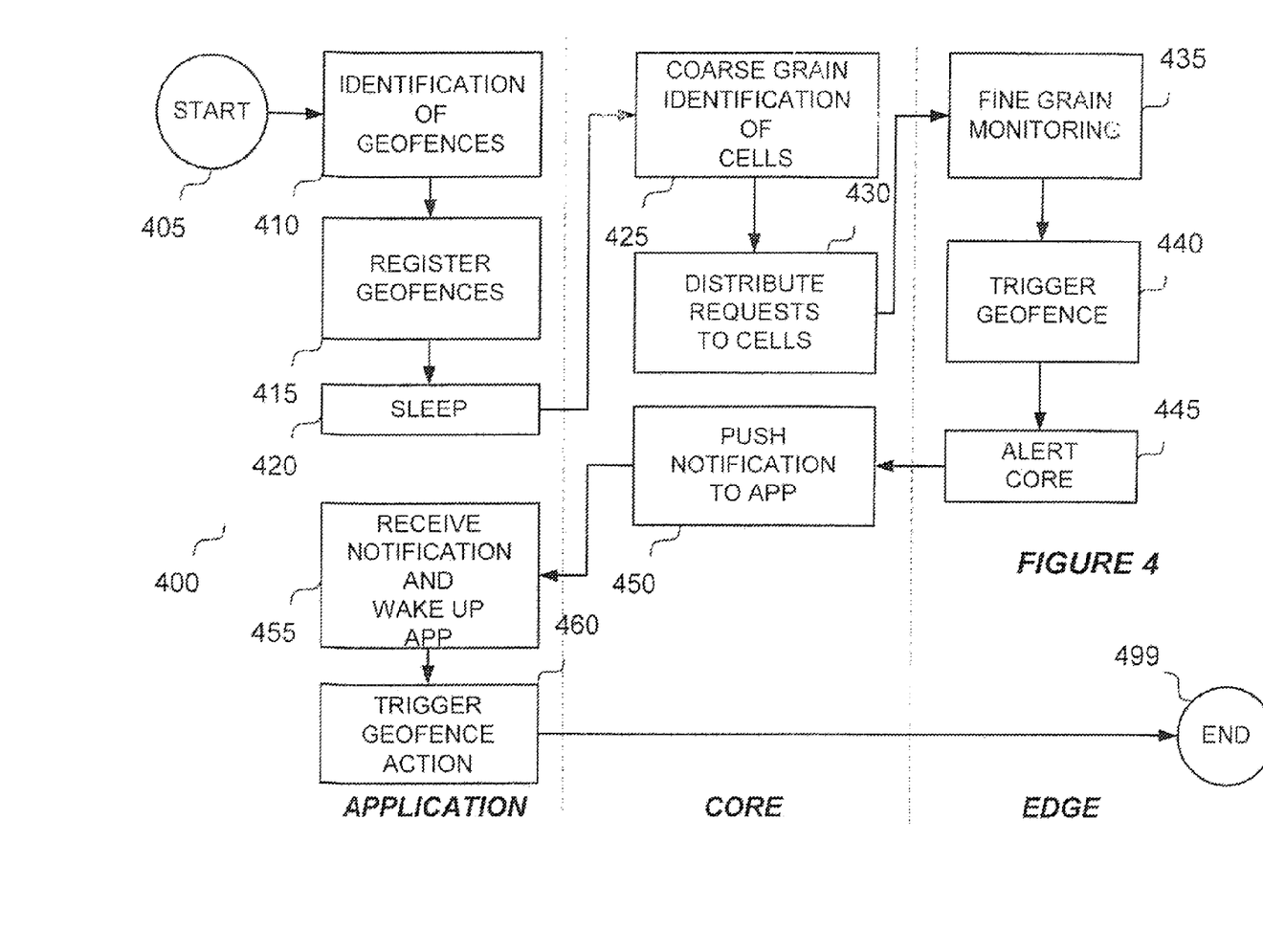
FIG. 4 is a high-level exemplary schematic flow diagram depicting operation method steps for managing geofences, in accordance with one or more aspects of the present invention.
Figure 5:
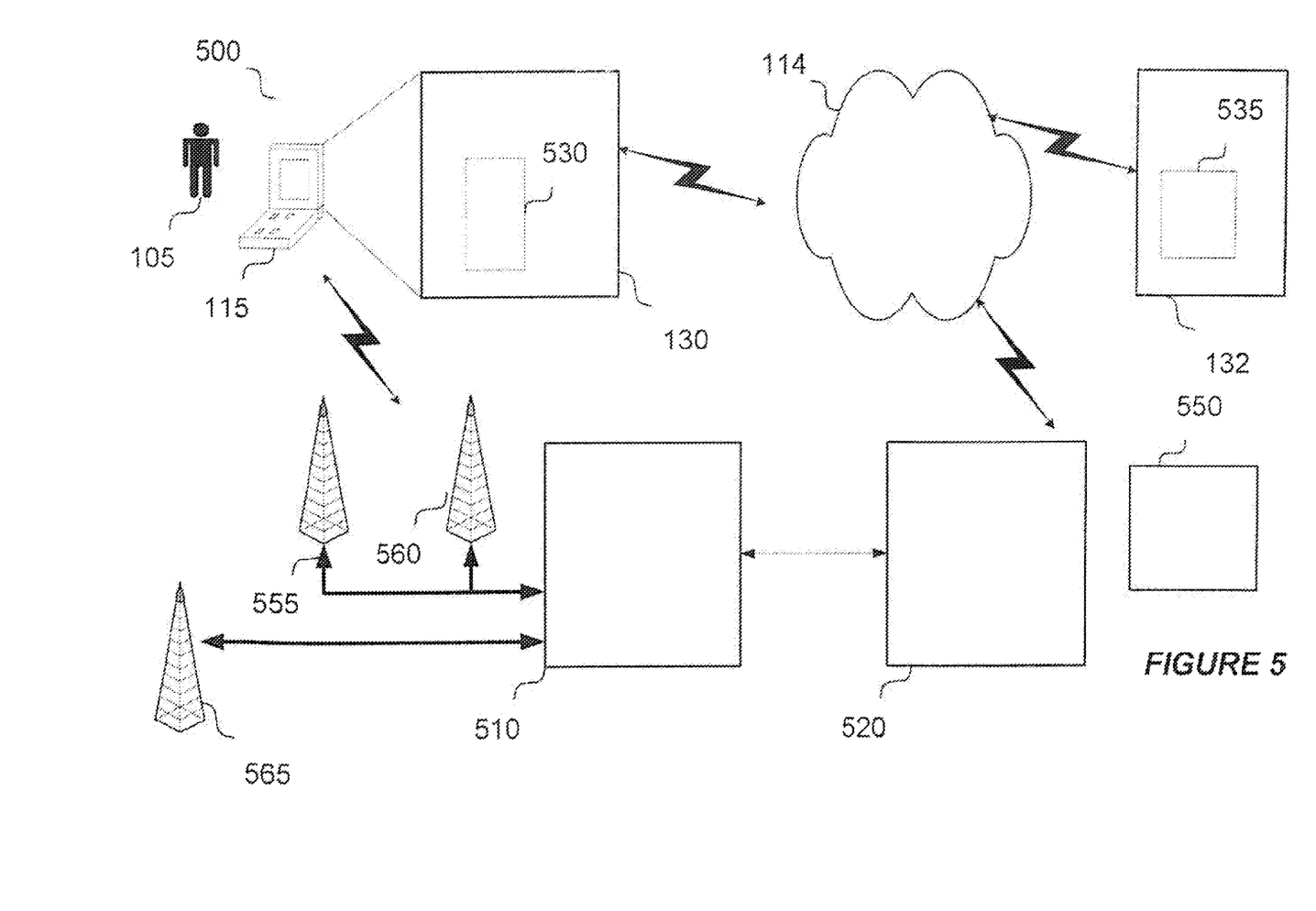
FIG. 5 is a block diagram depicting a geofence system, in accordance with one or more aspects of the present invention.
Figure 6:
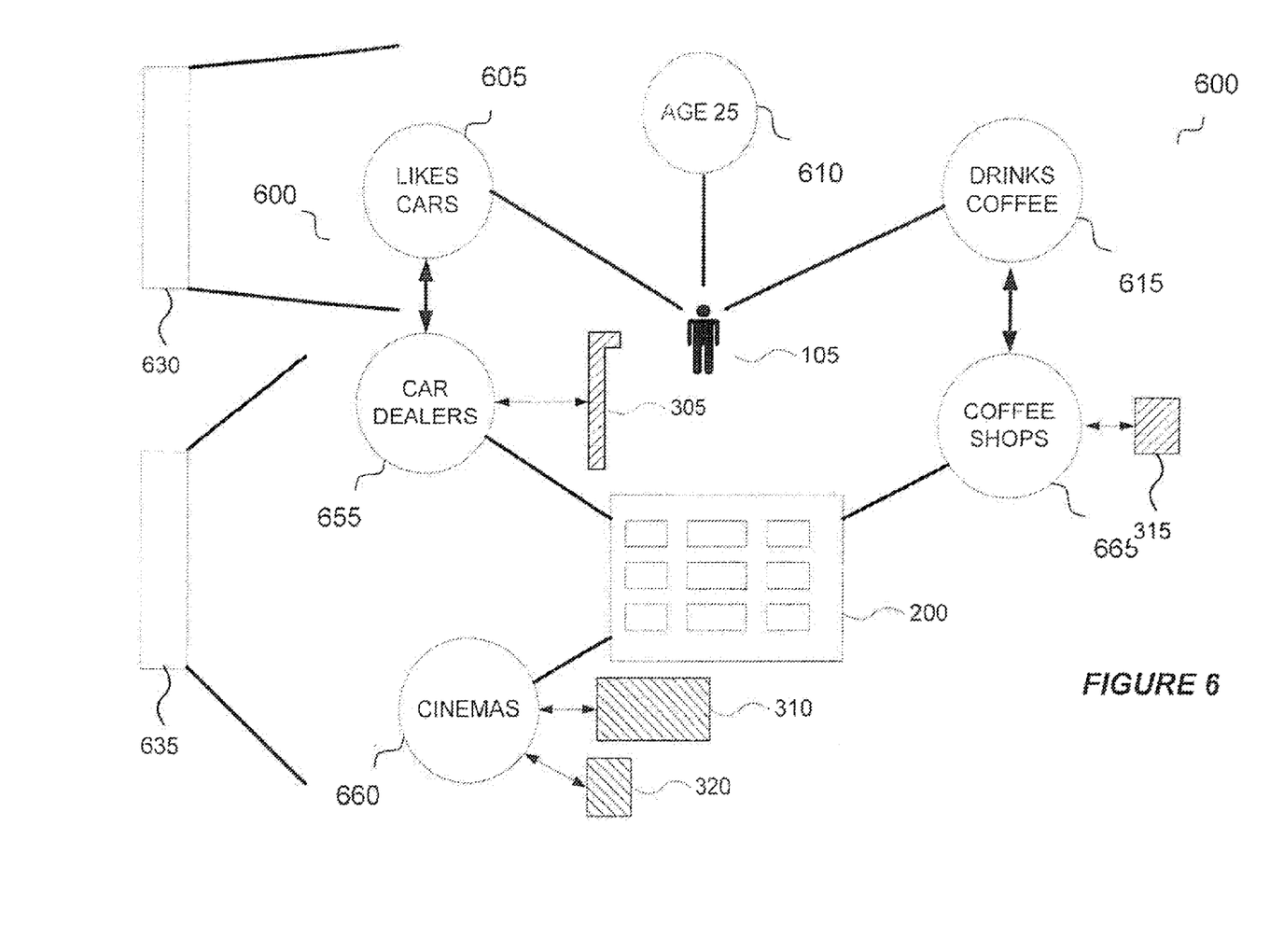
FIG. 6 is a diagram depicting mappings used in the identification of relevant geofences for a user, in accordance with one or more aspects of the present invention.
Figure 7:
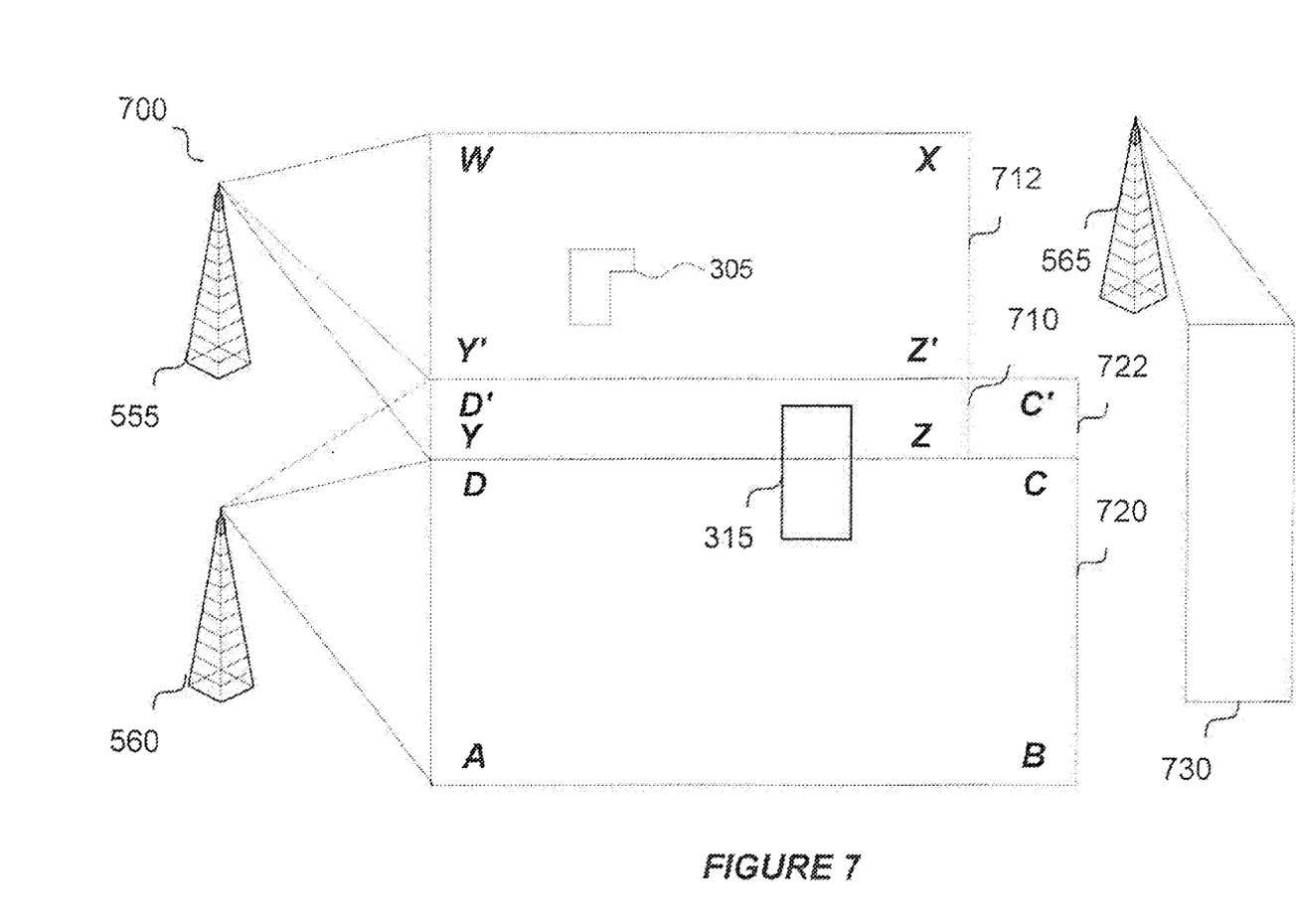
FIG. 7 is a diagram depicting a coarse grain identification of mobile phone cells in which one or more aspects of the present invention may be implemented.

FIG. 4, which should be read in conjunction with FIGS. 5 to 7, is a high-level exemplary schematic flow diagram 400 depicting operation method steps for managing geofences, in accordance with one or more aspects of the present invention. FIG. 5 is a block diagram depicting a geofence system 500, in accordance with one embodiment of the present invention. FIG. 6 is a diagram depicting mappings used in the identification of relevant geofences for a user, in accordance with one embodiment of the present invention. FIG. 7 is a diagram depicting a coarse grain identification of mobile phone cells in which one or more embodiments of the present invention may be implemented.

Referring to FIGS. 1-7 together, the method 400 of FIG. 4 starts at step 405. At step 410, the application 130, 132 operating with the mobile phone 115 of the user 105 identifies geofences 305, 315 that are relevant to the user 105. The identification of relevant geofences 305, 315 can be carried out in a number of ways known in the art. For example, a list of user preferences 630 can be matched with a category list 635. In the diagram of FIG. 6, the user preferences 630 of user 105 are depicted with "Likes Cars" 605, "Age 25" 610, and "Drinks Coffee" 615. The list of user preferences 630 can be stored in association with the client-side app 530. The list of user preferences 630 can be populated directly by the user 105. In an alternative embodiment, the list is populated based on alternative means, such as social network settings, a user profile or demographics of the user 105 (for example, age).

The category list 635 can be stored on the server-side app 132. In the diagram of FIG. 6, the category list 635 is depicted as comprising "Car Dealers" 655, "Coffee Shops" 665, and "Cinemas" 660. Each of the depicted categories 655, 660, 665 is associated with the map 200 of the town. Each category 655, 660, 665 of the category list 635 has an associated set of geofences 305, 310, 315. Although FIG. 6 depicts each of the categories 655, 660, 665 as having at least one associated geofence 305, 310, 315, 320, other categories (not depicted) may not have any associated geofence. Conversely, more than one of the categories 655, 660, 665, could be associated with the same geofence 305, 310, 315, 320. For example, a geofence defined for a bookshop that contains a coffee shop, could be associated with a category of "bookshop" and with a category of "coffee shop". The skilled person will appreciate that user preferences 630, and category list 635 could also be stored in different locations other than in the client-side app 130 and server-side app 132.

FIG. 6 depicts user preference "Likes Cars" 605 being matched with category "Car Dealers" 655; and, user preference "Drinks Coffee" 615 being matched with category "Coffee Shops" 665. However, there is no match for user preference "Age 25" 610, or for category "Cinemas" 660. As a result of the matching the geofences 305, 315 associated with the matched user preferences 605, 615 are identified as being relevant to the user 105.

At step 415, the application 130, 132 registers the identified geofences 305, 315 with the network 114. In one embodiment, the application 130, 132 registers the identified geofences 305, 315 with geofence core 520.

At step 420, the application 130, 132 puts the application into a power-saving mode, for example, by activating a "Sleep" mode, turning off GPS functionality or powering down the application processor. By turning off GPS, power is saved. By turning off the application processor leaving only the (low power) baseband processor running further power can be saved.

At step 425, the geofence core 520, having accepted the geofence registrations, carries out a coarse grained identification of a first location of the geofence, for example, which mobile phone cells broadly cover the known locations of the identified 305, 315. FIG. 7 depicts potential cell coverage 700 in the town, in accordance with the prior art, and in which one embodiment of the present invention may be implemented. First geofence 305 is covered by a first cell 710 shown as WXYZ. Second geofence 315 is covered by both first cell 710, and by a second cell 720, shown as ABCD. The first cell 710 is covered by a first radio mast 555, and the second cell 720 is covered by second radio mast 560. A third radio mast 565 of the system 500 covers third cell 730, but does not cover first geofence 305 nor second geofence 315.

Cell coverage is typically dynamic in that the geographic area covered can vary. This variation can be due to natural reasons, such as atmospheric condition changes. The variation can also be arranged by the network operators through a process of "cell breathing". Cell breathing allows overloaded cells to offload subscriber traffic to nearby cells by changing the geographic area of their service area. When overloaded, a cell can get smaller, and a neighbouring cell gets larger. FIG. 7 depicts such a dynamic change in cell coverage. As a result of cell breathing, first cell 712 is shown smaller as WXY'Z', and second cell 722 is shown larger as ABC'D'. First geofence 305 is still covered by first cell 712, but second geofence 315 is now covered solely by second cell 722. Although not depicted, the third radio mast 565 of the system 500 could cover first geofence 305 and/or second geofence 315 if third cell expanded due to cell breathing or natural changes. At the geofence core 520, location information is more granular and less frequently updated. A user 105 can be located either to their Cell ID or to a routing area (group of cells).

The skilled person would understand that there are a number of algorithms that could be used to identify which cells cover which geofences.

In another embodiment, the geofence core 520 carries out coarse-grained geolocation repeatedly to check whether the identified cells 710, 720 are still appropriate, and whether the first location of the geofence 305, 310, 315, 320 is still valid. In another embodiment, the identified cells 710, 720 are identified taking into consideration cell breathing, for example, by also identifying neighboring cells to the cell that the geofence is covered by.

At step 430, the geofence core 520 distributes requests to geofence edge devices servicing identified cells 710, 712, 720, 722. Edge devices are devices that provide entry points into core networks. Many different technologies can be used to provide edge devices.

For example, routers, radio masts, radio network controllers, and other points of aggregation. Other terminology include base stations, mobile phone masts, base station sites, base transceiver station (BTS)s, cell sites, cell towers. A typical cell will cover an area of 1-5 km$^2$. However, as technology improves typical areas could increase or decrease. However large an area covered by a cell, the advantage of the coarse grained identification is to narrow the location of interest down to a first level of granularity, for example to within the 1-5 km$^2$ area of the identified cell 710, 712, 720, 722, or to within the area covered by a small number of cells. The coarse-grained geolocation exposes geolocation information to a first granularity of geolocation precision. An example of a first granularity of time is to the cell area. This means that only the minimum number of edge devices needs to be involved in fine-grained geolocation processing.

At step 435, the geofence edge device 510 and associated radio masts 555, 560 monitor the geolocation of the user 105 with fine-grain geolocation. At the geofence edge device 510 it is possible to expose location information in real time on a second by second basis for all users. This is network location (not GPS) usually accurate to a few 10s of meters but sometimes accurate to a few meters. The fine-grained geolocation exposes geolocation information to a second granularity of geolocation precision. The second granularity of geolocation precision is greater that the first granularity of geolocation precision. For example the second granularity of geolocation precision may be a few 10s of meters, and the corresponding first granularity of geolocation precision may be the 5 km$^2$ (that is the area of a cell). The second granularity is fine-grained granularity. The first granularity is coarse-grained granularity. The first granularity is more coarse-grained than the second granularity.

At step 440, the geofence edge device 510 identifies that the user 105 has entered one of the geofences 305, 315. Entering the geofence 305, 315 which triggers the geofence 305, 315.

At step 445, the geofence edge device 510 alerts the geofence core 520 that the user 105 has triggered the geofence 305, 315. By triggering the geofence 305, 315, the user 105 has activated the geofence 305, 315.

At step 450, the geofence core 520 sends a first push notification to the application 530, 535.

At step 455, the application 530, 535 receives the first push notification and wakes up the application 530, 535 from its sleep mode. For example, the GPS functionality may be re-enabled.

At step 460, the application 530, 535 triggers an action associated with the geofence 305, 315. For example, a coffee retailer provides an application 530, 535 for a mobile device 115 which makes use of fine grain network geofence capabilities. The user 105 installs the application 530, 535 on their phone 115 and shares some profile data with the retailer. The application 530, 535 does not use the on-phone location capabilities because these waste battery power causing user 105 not to enable the application. When woken by a first push notification for an active geofence 305, 315 the application 530, 535 alerts the user 105, for example with a tone or vibration, and offers a voucher for 50% off coffee valid for 20 minutes.

At step 499, the method ends.

Another example of an action is to send the user 105 an SMS with a voucher for a coffee shop when they get close to the coffee shop which is empty right now, but not if the coffee shop is currently full so as to maximise utilisation of coffee shop staff.

Another example of an action is to send the user 105 approaching an airport south security, a message that they should go to north security to get to their plane more quickly due to shorter queues.

In an alternative embodiment of the present invention, the coarse-grained geolocation exposes geolocation information to a first granularity of time, and first granularity of geolocation precision. An example of a first granularity of time is every minute. The network core component coarse-grained geolocation may check that the geolocation of the geofence every minute. The fine-grained geolocation exposes geolocation information to second granularity of time, and to a second granularity of geolocation precision. The second granularity of time is less than the first granularity of time, and the second granularity of geolocation precision is greater that the first granularity of geolocation precision. For example, the second granularity of time may be second by second, and the corresponding first granularity of time minute by minute. Also, for example, the second granularity of geolocation precision may be a few 10s of meters, and the corresponding first granularity of geolocation precision may be the 5 km$^2$ (that is the area of a cell). The second granularity is fine-grained granularity. The first granularity is coarse-grained granularity. The first granularity is more coarse-grained than the second granularity.

In an alternative embodiment of the present invention, geolocation is carried out in three dimensions, so that first and second granularities refer to volumes.

In an alternative embodiment, system 500 also comprises a subscriber context component 550. In order to enable geofencing applications from partners it will be necessary for the operator to expose some subscriber information to partners. This might be highly anonymous, but would be enough to allow the application to send a Short message service (SMS) message to the user 105 that tripped the geofence 305, 351 and possibly find some context information about the user 105.

In an alternative embodiment, the application 530, 535 registers for a second push notification whenever the course-grain location changes. For example when the user 105 moves from one cell or group of cells to another.

In an alternative embodiment, the application 530, 535 registers for the second push notification only when a geofence made up of coarse-grain cell locations, to minimize app activity and save battery. When woken by a push notification indicating a coarse location change the application 530, 535 uses the context from the mobile phone device 115 and the server backend 140 to determine what geofences make sense for this user 105 at this time in this context at this location. For example, placing geofences 305, 310, 315, 320 around two of the four stores nearby which are not busy, but not placing the geofences 305, 310, 315, 320 around the busy stores.

As noted, in one or more embodiments, the application 530, 535 registers the geofences 305, 310, 315, 320 and goes to sleep waiting on a first push notification.

Figure 8:
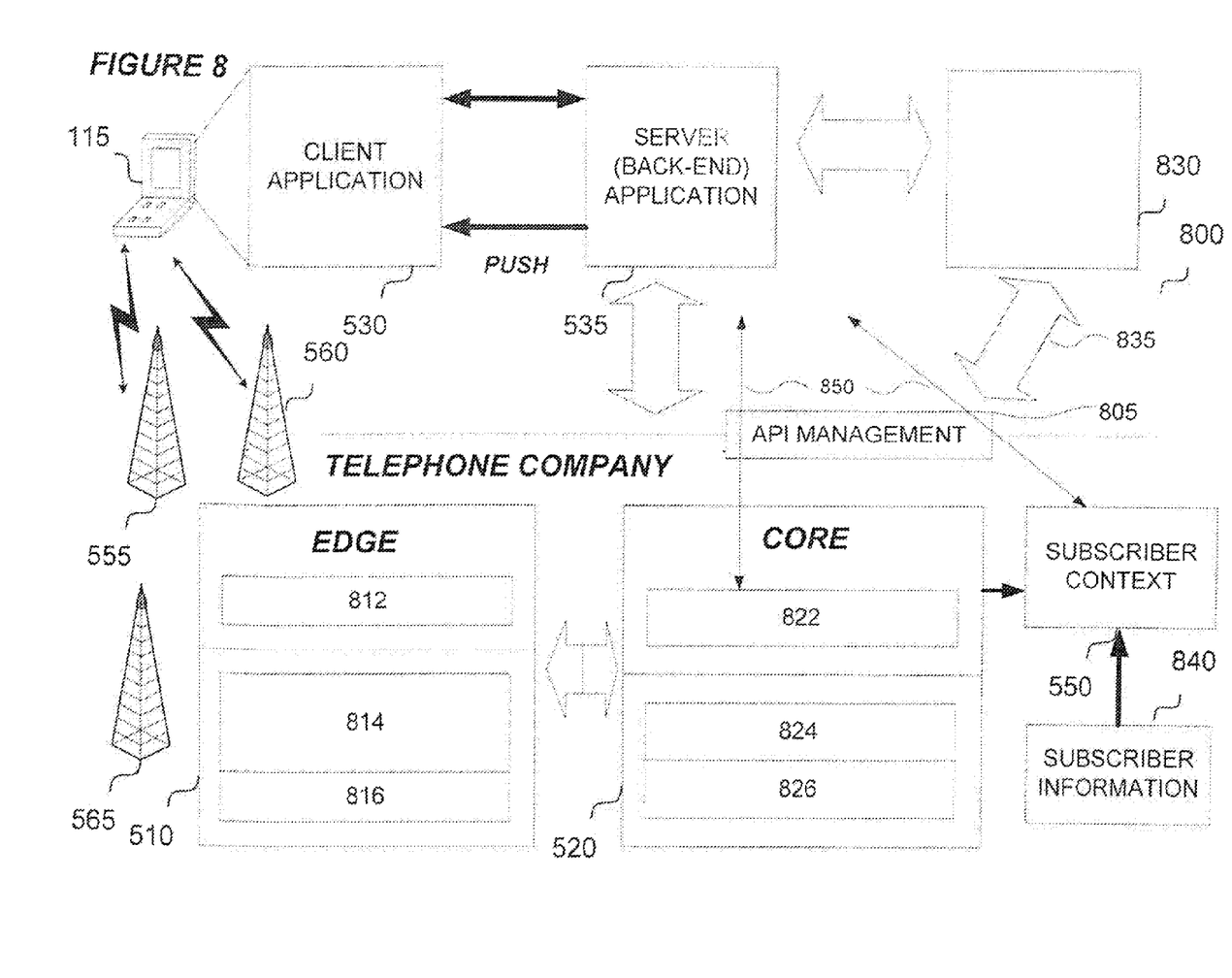
FIG. 8 depicts, in an alternative embodiment functionality of the geofence edge device provided by the IBM ASPN platform, in accordance with one or more aspects of the present invention.

FIG. 8 depicts, in an alternative embodiment of the present invention, functionality of the geofence edge device 510 provided by the IBM ASPN platform. The function my run in a virtual machine on top of the ASPN platform. In an alternative embodiment, this is implemented using streams.

As in the embodiments described above, client-side application 530 creates and/or identifies geofences in conjunction with the server-side application 535. Client-side application 530 receives push notifications from the server-side application 535 or directly from the geofence core 520.

An interface is provided between the user domain of the user 105 and the telephone company (telco) domain. An application programming interface (API) is provided through an API management component 805. An example of an API management component 805 is IBM Cast Iron®. The API Management component 805 allows geofencing 850 and context 850 APIs to be exposed.

Subscriber information 840 is provided to a subscriber context component 550. The subscriber context component 550 uses known data analytics functionality to provide a context for subscribers to the service. This allows for the list of user preferences 630, and category list 635 to be dynamically updated, so that a set of relevant geofences in real-time based on data analytics received by the application 530, 535. In order to enable geofencing applications from partners it will be necessary for the operator to expose some subscriber information to partners.

The mobile application 530, 535 exploits the API by determining approximately where it is.

Using social and other context and mapping data the application determines interesting geofences nearby for the user of this device. It places these geofences and goes to sleep.

The application receives a first push notification, waking it up if the network detects that a geofence is active. The application then alerts the user and interacts with them, for example, by providing electronic coupons, and other promotions.

Enterprise context component 830, such as IBM Enterprise Marketing Management offerings, allows enterprises to optimize price, promotion and product mix. The enterprise context component 830 interfaces 835 to the rest of the system 800 to provide geofencing API access for enterprise and server side applications. The geofence API is exploitable from service side applications also. For example, an enterprise places geofences for a set of users and sends them SMS messages when a geofence is triggered. The geofence API interfaces to the high precision location API at the edge.

The geofence core 520 comprises a core network radio information component 826, a core based location API 824, and a geofence core component 822. The core network radio information 826 provides coarse-grained network radio information for the core 520 functionality. In one embodiment of the core based location API 824, location information is more granular and less frequently updated. A user 105 can be located to either their cell ID or to a routing area (group of cells). The geofence core component 822 accepts geofence requests and routes these to the cell(s) serving the location covered by the geofence.

The geofence edge 510 comprises an edge network radio information component 816, high-precision edge location API 814, and a geofence edge component 822. The edge network radio information component 816 extracts network radio information, such as network measurement reports (NMRs), from the network control plane. The High-precision edge location component 814 uses the information provided by the edge network radio information component 816 to calculate the high precision location of the user. Using this information it is possible to expose location information in real time on a second by second basis for all users. This is network location (not GPS) usually accurate to a few 10s of meters but sometimes accurate to a few meters.

The geofence edge component 812 may run in a virtual machine on top of the ASPN environment. Also, it may be implemented using streams. It accepts requests for fine grain (small area) location fences placed by the core. It interfaces to the high precision location API 814 at the edge. The geofence edge component 812 monitors the location of the device 115 in real time to determine whether they have crossed the boundary of any active geofence. If it detects that a geo-fence that was previously inactive has becomes active it sends an event to the core. Similarly, if it detects that a geo-fence that was previously active has becomes inactive it sends an event to the core.

The geofence API is exploitable from service side applications also. For example an enterprise places geofences for a set of users and sends them SMS messages when a geofence is triggered.

In one embodiment, the geofence API calls comprise:
Placing the geofence (location, shape, size, device/user)
  Places a new geofence into the appropriate cell(s).
  Geofence can be set to expire on a timer or when user leaves area.
  Can be called from device to place a geofence for this device.
  Can be called from internet where caller has permission to track user/device.
  Events delivered over messaging technology when fence triggered.
Getting locality (device/user)
  Returns approximate, course-grain location of user
  Can be called from device to obtain device's own location.
  Can be called from internet where caller has permission to track user/device.

Those skilled in the art will note from the above description that, viewed from one aspect, the present invention provides a system for managing geofences comprising a system for managing a geofence of a mobile device in a network, comprising: a first application operable with the mobile device, the first application operable for: identifying the geofence associated with the mobile device or a user of the mobile device; and responsive to identifying the geofence, registering the identified geofence with a network component; the network component operable for: identifying, to a first granularity, a first location for the identified geofence; monitoring, to a second granularity, a location of the mobile device, wherein the first granularity is more coarse-grained than the second granularity; and responsive to the mobile device triggering the geofence, pushing a notification to the application; and the first application further operable for: responsive to receiving the notification, performing an operation associated with the geofence.

Viewed from a further aspect, the present invention provides a method for managing a geofence of a mobile device in a network, comprising: identifying, by a first application operable with the mobile device, the geofence associated with the mobile device or a user of the mobile device; and in response to identifying the geofence, registering by the first application the identified geofence with a network component; identifying, by the network component, to a first granularity, a first location for the identified geofence; monitoring, by the network component, to a second granularity, a location of the mobile device, wherein the first granularity is more coarse-grained than the second granularity; and, in response to the mobile device triggering the geofence, pushing, by the network component, a notification to the application; and in response to receiving the notification, performing, by the first application, an operation associated with the geofence.

The present invention may provide a system, wherein the first application is further operable for, responsive to registering the identified geofence, putting the application or mobile device into a power-saving state, and wherein the first application is further operable for, responsive to receiving the notification, waking up the application or mobile device from the power-saving state.

The present invention may include a system which further comprises the first application being operable for: registering the geofence with a geofence core of the network, and the network component further comprising: the geofence core for: accepting the registration for the geofence; identifying, to the first granularity, the first location; distributing a request to a geofence edge device, the request comprising the identified geofence; and responsive to receiving an alert from the geofence edge device, pushing the notification to the mobile device; and the geofence edge device operable for: accepting the request; monitoring, to the second granularity, the location of the mobile device; and responsive to the mobile device triggering the geofence, sending an event to the geofence core.

The present invention may provide a system which includes a set of the geofence edge devices, and wherein: the geofence core is further operable for: distributing a request to each of the set of geofence edge devices, the set of geofence edge devices covering the range of the first location. The present invention may provide a system, further comprising a set of the geofence edge devices, and wherein: the geofence core is further operable for: only distributing a request to each of the set of geofence edge devices, the set of geofence edge devices covering the range of the first location.

The present invention may include a system, wherein the network component is further operable for: identifying, to a first granularity of area, the first location for the identified geofence; and monitoring, to a second granularity of area, the location of the mobile device, wherein the first granularity of area covers a larger area than the second granularity of area.

The present invention may include a system, wherein the network component is further operable for: identifying, to a first granularity of time, the first location for the identified geofence; and monitoring, to a second granularity of time, the location of the mobile device, wherein the first granularity of time is less frequent than the second granularity of time.

The present invention may include a system, wherein the first application is further operable for creating the geofence. The present invention may include a system, wherein the first application is further operable for interacting with the user, is operable on the mobile device, and/or on a server device associated with the mobile device.

The present invention may include a system, further comprising a second application, responsive to the first application performing the operation, sending a message to the mobile device. The present invention may include a system, wherein the first application is further operable for identifying the geofence associated with a second location of the mobile device or the user. The present invention may provide a system, wherein the first application is operable, responsive to the second location changing, for receiving a push request to identify a geofence associated with the changed second location.

The present invention may include a method, wherein the method further comprises, in response to the registering of the identified geofence, putting, by the first application, the application or mobile device into a power-saving state.

The present invention may comprise a method, wherein the method further comprises, in response to receiving the notification, waking up, by the first application, the application or mobile device from the power-saving state.

The present invention may include a method comprising registering, by the first application, the geofence with a geofence core of the network, accepting, by the geofence core, the registration for the geofence; identifying, the geofence core, to the first granularity, the first location; distributing, the geofence core, a request to a geofence edge device, the request comprising the identified geofence; in response to receiving an alert from the geofence edge device, pushing, by the geofence core, the notification to the mobile device; and accepting, by the geofence edge device, the request; monitoring, by the geofence edge device, to the second granularity, the location of the mobile device; and in response to the mobile device triggering the geofence, sending, by the geofence edge device, an event to the geofence core.

The present invention may include a method, wherein the method further comprises: distributing by the geofence core a request to each of a set of geofence edge devices, the set of geofence edge devices covering the range of the first location.

The present invention may include a method, wherein the method further comprises: only distributing by the geofence core a request to each of a set of geofence edge devices, the set of geofence edge devices covering the range of the first location. Advantageously this allows for the network core to only involve those edge devices that cover the area of the geofence, rather than involving other edge devices that do not cover the area.

The present invention may comprise a method, further comprising a set of the geofence edge devices, and wherein: the geofence core is further operable for: distributing a request to each of the set of geofence edge devices, the set of geofence edge devices covering the range of the first location.

The present invention may comprise a method, wherein the method further comprises: identifying, by the network component, to a first granularity of area, the first location for the identified geofence; and monitoring, by the network component, to a second granularity of area, the location of the mobile device, wherein the first granularity of area covers a larger area than the second granularity of area.

The present invention may include a method, wherein the method further comprises: identifying, by the network component, to a first granularity of time, the first location for the identified geofence; and monitoring, by the network component, to a second granularity of time, the location of the mobile device, wherein the first granularity of time is less frequent than the second granularity of time.

The present invention may include a method, wherein the method further comprises creating, by the first application, the geofence. Preferably, the present invention provides a method, wherein the method further comprises interacting, by the first application, with the user. The present invention may provide a method, wherein the first application is operable on the mobile device, and/or is operable on a server device associated with the mobile device.

The present invention may comprise a method, wherein the method further comprises in response to the first application performing the operation, sending, by a second application, a message to the mobile device. The present invention may provide a method, wherein the method further comprises identifying, by the first application, the geofence associated with a second location of the mobile device or the user.

The present invention may provide a method, wherein the method further comprises, in response to the second location changing, receiving, by the first application, a push request to identify a geofence associated with the changed second location.

Viewed from a further aspect, the present invention provides a computer program product for managing geofences, the computer program product comprising a computer readable storage medium readable by a processing circuit and storing instructions for execution by the processing circuit for performing a method for performing the steps of the invention.

Viewed from a further aspect, the present invention provides a computer program stored on a computer readable medium and loadable into the internal memory of a digital computer, comprising software code portions, when said program is run on a computer, for performing the steps of the invention.

Advantageously, embodiments of the present invention provide a fine-scale network based geofencing API which is implemented by addressing the scaling issues by distributing the task into the network.

Using embodiments of the present invention, mobile applications can define small geofences. For example if the owner of the device is someone who drinks coffee at 10 am it may be worth defining geofences close to a coffee shop near to the current location of the user.

In the description provided herein, the words cell tower may mean the cellular network transceiver otherwise known as a BTS, or NodeB in 3G networks or the eNodeB in LTE networks.

Advantageously, geofences are registered in the network and then the application goes to sleep or enters a low power, dormant state on the mobile device. An example of a mobile device is a cell phone, also known as mobile phone. The network distributes the geofences to the cell towers which cover the area defined by the geofence. One method of identifying which cell towers cover a particular geofence is by computing the distance between a cell tower and the region defining the geofence. Another technique is to use the detailed network planning maps and data available to the mobile network operator. These cell towers monitor the fine-scale location of the mobile device in real time. If any of the geofences are activated then the application on the device is woken by a push notification. When the device is woken it can alert the user, perhaps by vibrating or making a sound.

Advantageously, a mobile application which uses fine scale geofencing can be implemented without flattening the device battery. This means that the application can be left enabled at all times. This means that the application can get dramatically improved response rates to promotions, coupons, or real-time alerts. Furthermore the application can give timely and context sensitive advice on location sensitive matters such as which security area to go through at the airport where the lines are shortest.

Use of a scalable, in-network, geofencing method, system and API that can track individual users in real time and wake the application with a first push notification when the geofence fires.

The individual concepts of network geofencing and push notifications are not new. However in combination the concepts can move the required computing capability into the network in order to allow fine-scale geolocation and management of geofences.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, aspects of the present invention may be embodied as a system, method, computer program product or computer program.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed as meaning "consisting only of".

IBM, WebSphere and Cast Iron are trademarks of International Business Machines Corporation, registered in many jurisdictions worldwide.

Bluetooth is a trademark or registered trademark of Bluetooth SIG Inc., registered in many jurisdictions worldwide.

The invention claimed is:

1. A system for managing a geofence of a mobile device in a network, the system comprising:
    a memory; and
    a processor communicatively coupled to the memory, wherein the system performs a method comprising:
        identifying, by a geofence core associated with the network, one or more cell towers with cell coverage area overlapping, at least in part, an area identified by the geofence, the geofence being associated with a mobile device or a user of the mobile device, the mobile device or an application on the mobile device being in a power-saving state;
        identifying, by the geofence core, via the one or more cell towers, to a first granularity when the mobile device enters the cell coverage area of the one or more cell towers;
        monitoring, by the geofence core, via the one or more cell towers, to a second, finer granularity a location of the mobile device when within the cell coverage area of the one or more cell towers in relation to the area identified by the geofence;
        based on the monitoring determining that the mobile device has crossed the geofence, pushing by the geofence core a notification to the mobile device to facilitate awakening the application or the mobile device from the power-saving state and performing an operation associated with the geofence; and
        wherein the identifying when the mobile device enters the cell coverage area of the one or more cell towers, and the monitoring location of the mobile device when within the cell coverage area of the one or more cell towers in relation to the area identified by the geofence are network based processes occurring external to the mobile device, without relying on mobile device based geolocation capabilities of the mobile device.

2. The system of claim 1, wherein the geofence core further performs:
    accepting the registration for the geofence;
    distributing a request to a geofence edge device associated with a cell tower of the one or more cell towers, the request comprising the identified geofence, the geofence edge device to accept the request, monitor location of the mobile device, when within the cell coverage area of the associated cell tower, and send an alert event from the geofence edge device to a geofence manager based on the mobile device crossing the geofence; and based on receiving the alert event from the geofence edge device, pushing the notification to the mobile device.

3. The system of claim 2, wherein the system further performs:

distributing a request to each of a set of geofence edge devices, the set of geofence edge devices facilitating monitoring the coverage area of the one or more cell towers.

4. The system of claim 1, wherein the geofence further performs:

identifying, to the first granularity of area, the identified geofence; and monitoring, to the second granularity of area, the location of the mobile device, wherein the first granularity of area covers a larger area than the second granularity of area.

5. The system of claim 4, wherein the geofence core further performs:

identifying, to the first granularity of time, the identified geofence; and monitoring, to the second granularity of time, the location of the mobile device, wherein the first granularity of time is less frequent than the second granularity of time.

6. The system of claim 1, wherein an application of the mobile device facilitates associating the mobile device to the geofence.

7. The system of claim 1, wherein the notification relates to an application of the mobile device which is operable to interact with the user.

8. The system of claim 1, wherein the notification relates to an application of the mobile device which is operable on the mobile device.

9. The system of claim 1, wherein the notification relates to an application of the mobile device which is operable on a server device associated with the mobile device.

10. The system of claim 1, wherein the geofence core further performs, based on the application performing the operation, sending a message to the mobile device.

11. The system of claim 1, wherein the application is operable to identify the geofence associated with an other location of the mobile device or the user.

12. The system of claim 11, wherein the geofence core further performs, based on the other location changing, sending a push request to identify a geofence associated with the changed other location.

13. A method of managing a geofence of a mobile device in a network, comprising:

identifying, by a geofence core associated with the network, one or more cell towers with cell coverage area overlapping, at least in part, an area identified by the geofence, the geofence being associated with a mobile device or a user of the mobile device, the mobile device or an application on the mobile device being in a power-saving state;

identifying, by the geofence core, via the one or more cell towers, to a first granularity when the mobile device enters the cell coverage area of the one or more cell towers;

monitoring, by the geofence core, via the one or more cell towers, to a second, finer granularity a location of the mobile device when within the cell coverage area of the one or more cell towers in relation to the area identified by the geofence;

based on the monitoring determining that the mobile device has crossed the geofence, pushing by the geofence core a notification to the mobile device to facilitate awakening the application or the mobile device from the power-saving state and performing an operation associated with the geofence; and wherein the identifying when the mobile device enters the cell coverage area of the one or more cell towers, and the monitoring location of the mobile device when within the cell coverage area of the one or more cell towers in relation to the area identified by the geofence are network based processes occurring external to the mobile device, without relying on mobile device based geolocation capabilities of the mobile device.

14. The method of claim 13, further comprising:

accepting by the geofence core the registration for the geofence;

distributing a request to a geofence edge device associated with a cell tower of the one or more cell towers, the request comprising the identified geofence, the geofence edge device to accept the request, monitor location of the mobile device when within the cell coverage area of the associated cell tower, and send an alert event from the geofence edge device to a geofence manager based on the mobile device crossing the geofence;

based on receiving an alert event from the geofence edge device, pushing the notification to the mobile device.

15. The method of claim 14, further comprising:

distributing, by the geofence core, a request to each of a set of geofence edge devices, the set of geofence edge devices facilitating monitoring the coverage area of the one or more cell towers.

16. A computer program product for managing a geofence of a mobile device in a network, the computer program product comprising:

a non-transitory computer-readable storage medium having program instructions embodied therewith, the program instructions being executable by a processor to cause the processor to perform a method comprising:

identifying, by a geofence core associated with the network, one or more cell towers with cell coverage area overlapping, at least in part, an area identified by the geofence, the geofence being associated with a mobile device or a user of the mobile device, the mobile device or an application on the mobile device being in a power-saving state;

identifying, by the geofence core, via the one or more cell towers, to a first granularity when the mobile device enters the cell coverage area of the one or more cell towers;

monitoring, by the geofence core, via the one or more cell towers, to a second, finer granularity a location of the mobile device when within the cell coverage area of the one or more cell towers in relation to the area identified by the geofence;

based on the monitoring determining that the mobile device has crossed the geofence, pushing by the geofence core a notification to the mobile device to facilitate awakening the application or the mobile device from the power-saving state and performing an operation associated with the geofence; and wherein the identifying when the mobile device enters the cell coverage area of the one or more cell towers, and the monitoring location of the mobile device when within the cell coverage area of the one or more cell towers in relation to the area identified by the geofence are network based processes occurring external to the mobile device, without relying on mobile device based geolocation capabilities of the mobile device.

\* \* \* \* \*

UNITED STATES PATENT AND TRADEMARK OFFICE
CERTIFICATE OF CORRECTION

PATENT NO. : 9,998,860 B2
APPLICATION NO. : 14/901124
DATED : June 12, 2018
INVENTOR(S) : Nicholson et al.

It is certified that error appears in the above-identified patent and that said Letters Patent is hereby corrected as shown below:

On the Title Page

In the Inventors (72): Delete "Kiran Raghu GANTI" and insert -- Raghu Kiran GANTI --

Signed and Sealed this
Fourteenth Day of February, 2023

Katherine Kelly Vidal
*Director of the United States Patent and Trademark Office*